United States Patent
Crossdale et al.

(10) Patent No.: US 8,490,840 B2
(45) Date of Patent: Jul. 23, 2013

(54) DISPENSING CLOSURE

(75) Inventors: Garry W. Crossdale, Ripley (GB);
Brian D. Haworth, Voorburg (NL);
Barry Hague, Rotherham (GB);
Lambertus G. P. van der Heijden,
Bunnik (NL); Martin Cooper, Leicester
(GB)

(73) Assignee: Diversey, Inc., Sturtevant, WI (US)

( * ) Notice: Subject to any disclaimer, the term of this
patent is extended or adjusted under 35
U.S.C. 154(b) by 670 days.

(21) Appl. No.: 12/527,854

(22) PCT Filed: Feb. 14, 2008

(86) PCT No.: PCT/US2008/053926
§ 371 (c)(1),
(2), (4) Date: Feb. 23, 2010

(87) PCT Pub. No.: WO2008/103591
PCT Pub. Date: Aug. 28, 2008

(65) Prior Publication Data
US 2010/0163585 A1    Jul. 1, 2010

Related U.S. Application Data

(60) Provisional application No. 60/890,946, filed on Feb. 21, 2007.

(51) Int. Cl.
*B65D 5/72* (2006.01)
*B65D 25/40* (2006.01)
*B65D 35/38* (2006.01)

(52) U.S. Cl.
USPC ........................................ 222/501

(58) Field of Classification Search
USPC ............... 222/501, 325, 181.3; 251/149.1, 251/144; 141/346–349
See application file for complete search history.

(56) References Cited

U.S. PATENT DOCUMENTS

| | | | |
|---|---|---|---|
| 3,647,122 A * | 3/1972 | Nigro | 222/501 |
| 4,375,864 A * | 3/1983 | Savage | 222/501 |
| 4,380,310 A | 4/1983 | Schneiter et al. | |
| 5,014,887 A * | 5/1991 | Kopp | 222/402.1 |

(Continued)

FOREIGN PATENT DOCUMENTS

| | | |
|---|---|---|
| KR | 10-1996-0038199 | 11/1996 |
| KR | 20-1997-0024789 | 6/1997 |
| KR | 10-2002-0063047 | 8/2002 |
| WO | WO 9421550 A1 * | 9/1994 |

OTHER PUBLICATIONS

The International Search Report prepared by the Korean Intellectual Property Office Date: Jul. 18, 2008.

*Primary Examiner* — Paul R Durand
*Assistant Examiner* — Vishal Pancholi
(74) *Attorney, Agent, or Firm* — Michael Best & Friedrich LLP

(57) ABSTRACT

A resealable closure and valve assembly adapted to be coupled to a container to selectively control the dispensing of liquid from the container. The resealable closure and valve assembly includes a non-mechanically biased stop selectively engageable with a passageway to selectively seal the passageway from a dispensable product, such as a liquid contained within a container. In some embodiments, the stop is adapted to reseal the passageway by the force of weight applied to the stop by fluid in the container. In some embodiments, the stop is adapted to reseal the passageway via a suction force.

11 Claims, 2 Drawing Sheets

U.S. PATENT DOCUMENTS

| | | |
|---|---|---|
| 5,058,780 A | 10/1991 | Plester et al. |
| 5,392,939 A * | 2/1995 | Hidding et al. ............... 215/265 |
| 5,467,806 A | 11/1995 | Stricklin et al. |
| 5,617,906 A * | 4/1997 | Braatz et al. .................... 141/21 |
| 5,647,416 A * | 7/1997 | Desrosiers et al. ........... 141/351 |
| 5,827,486 A | 10/1998 | Crossdale |
| 5,908,143 A | 6/1999 | Crossdale et al. |
| 5,957,316 A * | 9/1999 | Hidding et al. ............... 215/265 |
| 6,126,045 A | 10/2000 | Last |
| 6,161,726 A * | 12/2000 | Parsons et al. .................. 222/52 |
| 6,193,113 B1 * | 2/2001 | Hidding ........................ 222/325 |
| 6,347,785 B1 | 2/2002 | Copp et al. |
| 6,568,438 B2 | 5/2003 | Crossdale et al. |
| 6,637,725 B2 | 10/2003 | Davis et al. |
| 6,644,519 B2 | 11/2003 | Last |
| 2004/0256424 A1 | 12/2004 | Johnson |
| 2006/0144875 A1 | 7/2006 | Etesse |

* cited by examiner

DISPENSING CLOSURE

BACKGROUND OF THE INVENTION

Various closure and valve mechanisms are used to selectively control the flow of a liquid, such as chemicals, food items, and the like from a disposable package such as flexible collapsible bag. In many of these closures, the valve opens is opened as a dispensing connector is connected to the closure and closes as it is disconnected therefrom to prevent the liquid from draining from the bag. Generally, these types of closures utilize a spring or other mechanical bias member for closing the valve. Unfortunately, these mechanical bias members can have a slow response time, especially when held in an open position for a long period of time, or they can be stressed beyond their elastic limits. As such, liquid can leak through the valve when the valve is disconnected from the dispenser.

SUMMARY OF THE INVENTION

The present invention relates to a closure and valve mechanism adapted to selectively control the flow of liquid through the valve without the use of a mechanical bias member. Specifically, the valve in some embodiments is closed by the weight or force applied to the valve plug by the liquid being dispensed. Also, the valve in some embodiments utilizes a suction force to close the valve.

Some embodiments of the invention provide a combination of a dispenser with a protruding dispensing peg and a container, the container having a container body for holding a volume of liquid and an outlet through which the liquid can be removed, the outlet including an outlet passageway and a stop member, the stop member having a cross-section of a predetermined shape and at least a section of the outlet passageway having a cross-sectional shape which is smaller than that of the stop member, the stop member being moveable by the dispensing peg from a storage position in which it is retained in the outlet passageway to seal the container to a discharge position in which it is moved out of the passageway by the peg, upon placement of the container on the dispenser, to allow the liquid to be removed, and to a temporary sealing position in which it abuts the passageway when the container is removed from the dispenser, the said peg being shaped so as to allow a flow of liquid along its length.

One aspect of the invention relates to a liquid container having a resealable outlet for use on a dispenser for dispensing liquid from the container. The container outlet comprises a passageway and a non-mechanically biased stop selectively engageable with the passageway to seal the passageway from liquid in the container. The passageway is accessible beneath the stop by a dispenser peg for insertion in the passageway to push the stop inwardly of the passageway toward a container interior. The stop comprises a tapered body, a first annular flange coupled to the tapered body, a first skirt extending away from the first annular flange, a second annular flange coupled to the first skirt, and a second skirt extending away from the second annular flange. The stop is adapted to reseal the passageway by the force of weight applied to the first and second annular flange by fluid in the container.

Some embodiments of the invention relate to a resealable closure and valve assembly adapted to be coupled to a container to selectively control the dispensing of liquid from the container. The resealable closure and valve assembly comprises a cap having an opening and adapted to be coupled to an opening of a container, a tubular passageway coupled to the opening in the cap, the tubular passageway having a first end coupled to the opening in the cap and a second end extending distally relative to the opening in the cap, and a non-mechanically biased stop selectively engageable with the second end of the tubular passageway to selectively seal the passageway from dispensing liquid contained within the container. The stop comprising a tapered body dimensioned and configured to extend into the second end of the tubular passageway and selectively form a seal against an inner surface of the tubular passageway. The stop also comprising a first annular flange coupled to the tapered body and extending away from the tapered body, wherein the stop is adapted to reseal the passageway by the force of weight applied to the first annular flange by fluid in the container. In some embodiments, the stop also includes a first skirt extending away from the first annular flange, wherein the first skirt at least partially defines a tapered annular recess for receiving the second end of the passageway and at least a portion of the first skirt engages an outer surface of the passageway when the stop sealingly engages the passageway.

Further aspects of the present invention, together with the organization and operation thereof, will become apparent from the following detailed description of the invention when taken in conjunction with the accompanying drawings.

Figure 1:
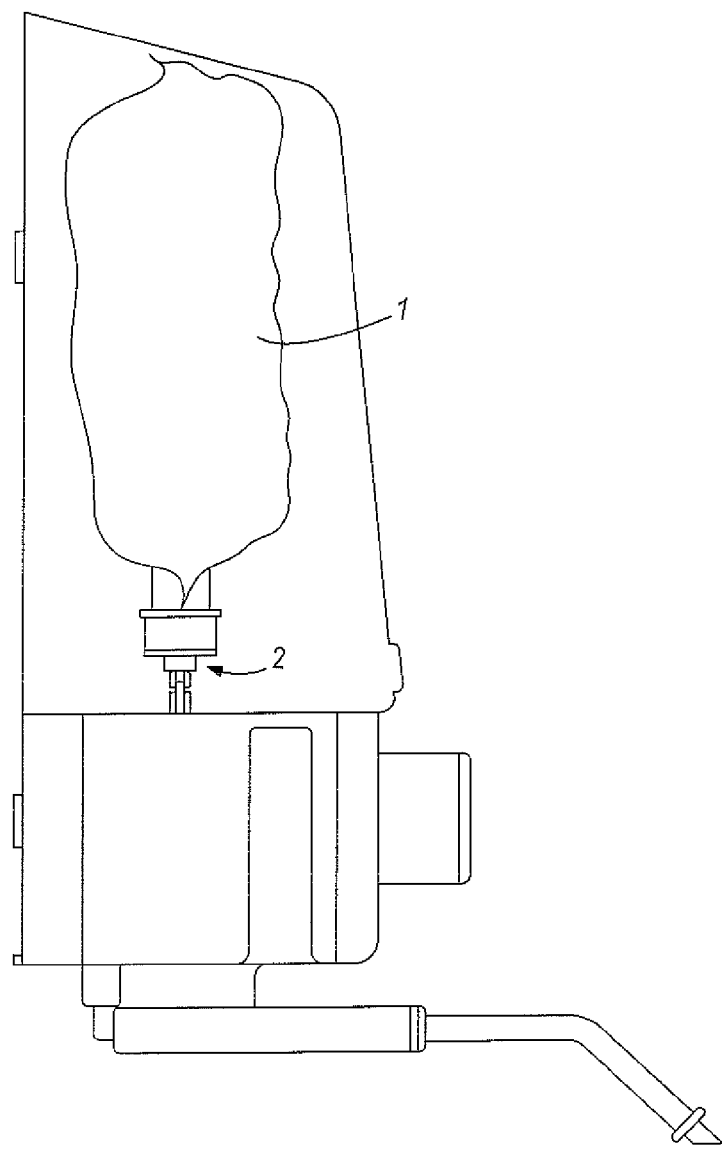
FIG. 1 is a schematic side view of an exemplary dispensing device housing a container with a closure valve.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

DETAILED DESCRIPTION

FIG. 1 shows an exemplary dispenser assembly housing a container 1 having a dispensable outlet 2. Since the dispenser shown in this figure is merely exemplary it will not be described in any detail. However, such a dispenser can be similar to that described in U.S. Pat. No. 5,827,486, U.S. Pat. No. 5,908,143, and U.S. Pat. No. 6,568,438, for example.

The container 1 is preferably formed of thin material, such as a polyethylene sheet, so that it collapses as the liquid is removed from the container. However, other container materials and constructions are possible, such as a relatively more rigid structure.

Figure 2:
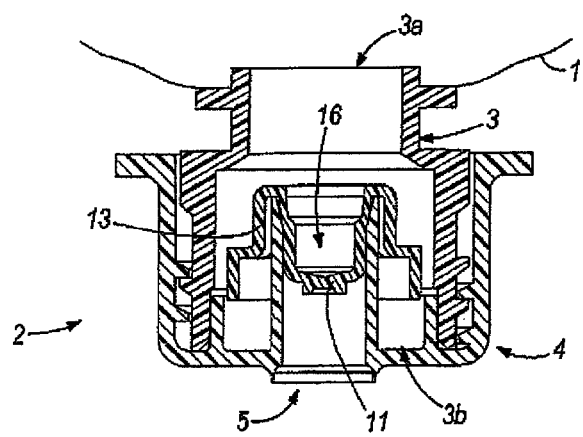
FIG. 2 is a side cross-sectional view of a closure valve embodying aspects of the invention, wherein the closure valve is shown in a sealed or closed position.
Figure 3:
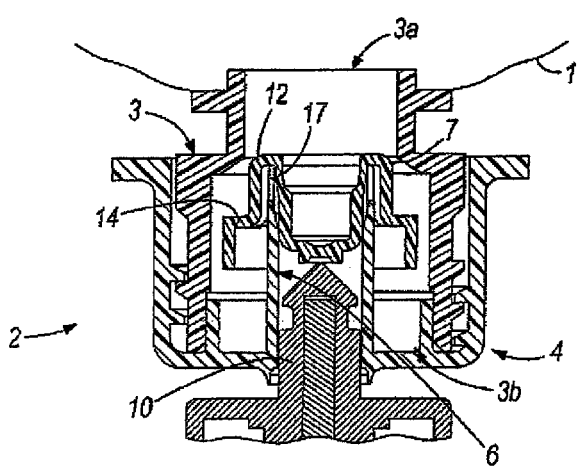
FIG. 3 is a side cross-sectional view of the closure valve shown in FIG. 2, wherein the closure valve is shown in a partially open, partially closed position.
Figure 4:
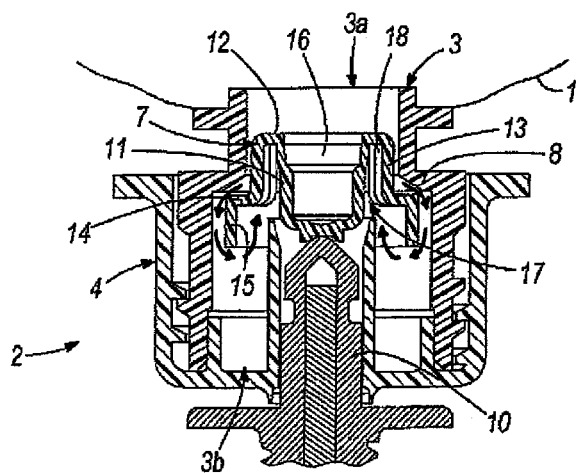
FIG. 4 is a side cross-sectional view of the closure valve shown in FIG. 2, wherein the closure valve is shown in an open position.

The outlet 2 for the container is shown in detail in FIGS. 2-4. The outlet 2 includes a neck 3 which is connected to an opening in the container 1. In the illustrated embodiment, the neck 3 is coupled to the opening of the container 1 at a flanged portion of the neck. In the illustrated embodiment, the neck 3 has a generally cylindrical shape with a first opening 3a located proximate the container 1 and a second opening 3b located distally from the container 1. The outer circumference of the distal end of the neck includes a coupling. In the illustrated embodiment the coupling is an outward extending thread. However, in other embodiments, the coupling can comprise other forms.

As illustrated in FIGS. 2-4, the neck 3 includes an inner lip 8 along the passageway of the neck defining a position beyond which a portion of the stop member 7 cannot be pushed further along the passageway. The inner lip 8 of the illustrated embodiment is defined by a change in the radius of the neck 3. In other words, the neck has a first diameter on one side of the lip and a second diameter on the other side of the neck 3. However, in other embodiments, the inner lip can be formed from a flange extending into the passageway within the neck. Furthermore, in some embodiments, such as the one illustrated, the inner lip 8 is chamfered, providing a transition zone between the two diameter portions of the neck.

The outlet 2 also includes a cap or closure body 4 that is adapted to Selectively control the passage of liquid from the container 1 and through the outlet 2. The closure 4 includes a passageway 5 that is selectively blocked by a stop member, valve plug, slider, and the like 7 (hereinafter stop or stop member). The closure 4 can include threads or other features that allow the closure to be screwed, press fit, welded, adhered, and the like into the outer end of neck 3.

Specifically, as illustrated in FIGS. 2-4, the passageway 5 has a predetermined configuration, which is preferably circular or cylindrical tube, that is sized or dimensioned to be slightly smaller than that of the center most portion of the stop member 7 so that this portion of the stop member jams or wedges therein to block the flow of liquid through the passageway 5. The passageway 5, as shown in the illustrated embodiment, is a cylindrical tube extending from the cap 4 into the neck. More specifically, the tube extends from an opening in the cap 4. One end of the passageway 5 is supported in a cantilevered fashion from the other end coupled to the cap. The cantilevered end is tapered on the inner surface.

The stop member 7 is configured and designed to engage the passageway 5 in the closure 4 to selectively control the flow of liquid through the outlet. The illustrated stop member 7 includes a tapered body 11, a first annular flange 12 coupled to the tapered body 11, a first skirt 13 extending away from the first annular flange 12, a second annular flange 14 coupled to the first skirt 13, and a second skirt 15 extending away from the second annular flange 14. As shown in the illustrations, the stop member 7 is not connected to the closure 4. Rather, the stop member 7 is an independent structure that is unconnected to the closure 4 by contained by the closure 4 and neck 3. In other words, the stop member 7 is not coupled to the closure 4 or neck by a mechanical bias member like many other conventional arrangements.

The tapered body 11 that is sized and configured to be at least partially received within the passageway 5 and selectively form a sealing engagement with the inner surface 6 of the passageway 5. The tapered body 11 can be a solid body structure in some embodiments. However, in other embodiments, the tapered body 11 can have a hollow or open structure as shown in the FIGS. 2-4. Specifically, as shown in these figures, an upwardly facing recess is positioned within the tapered body 11. This recess can be included for one of several reasons. For example, this recess reduces material cost. Also, this recess allows the tapered body 11 to be more flexible to easily deform while engaging the inner surface of the passageway 5 to allow greater penetration.

As indicated above, a first annular flange 12 is coupled to and extends from the tapered body 11 of the stop member 7. The first annular flange 12 extends in a generally radial direction away from the top of the tapered body 11. The first annular flange 12 extends out to a radius that is slightly less than the radius of the inner lip or smaller radius portion of the neck 3. Generally, this first annular flange 12 is relatively flat or planar along the radial direction. This can allow for maximum downward force of fluid pressure within the container to be applied to the stop 7 to bias the stop 7 toward a closed position.

A first skirt 13 extends from the first annular flange 12 in a generally axial direction. The first skirt 13 extends between the first annular flange 12 and the second annular flange 14. The first skirt 13 is coupled to the first annular flange 12 at about the outer circumference of the first annular flange 12. The first skirt 13 is coupled to the second annular flange 14 at about the inner circumference of the second annular flange 14. In the illustrated embodiment, the first skirt 13 extends slightly greater than about half the height of the tapered body 11. In other embodiments, the length of the first skirt 13 can be greater or less than that illustrated. As shown in the figures, the first skirt 13, the first annular flange 12, and the tapered body 11 together define a downward facing annular recess 17 that tapers toward the first annular flange 12. This annular recess 17 is dimensioned and configured to at least partially receive the cylindrical tube defining the passageway 5. As best illustrated in FIG. 4, the inner surface of the first skirt 13 is provided with a plurality of elongated ribs 18 extending in a first direction along the height of the first skirt 13 and in a second direction substantially radially toward the tapered body 11. These ribs 18 can engage the outer surface of the tubular passageway 5 to help hold the stop 7 in a sealed position as shown in FIG. 2. Although these ribs 18 are shown in the illustrated embodiment, some embodiments may not utilize them.

As mentioned above, a second annular flange 14 extends from the first skirt 13 in a radial direction away from the tapered body 11. The second annular flange 14 extends out to a radius that is less than the radius of the larger radius portion of the neck 3. As such, the second annular flange 14 can engage the lip 8 within the neck to limit the movement of the stop 7 while the stop 7 is in the open position. Generally, this second annular flange 14 is relatively flat or planar along the radial direction. This can allow for maximum downward force of fluid pressure within the container to be applied to the stop to bias the stop toward a closed position.

The second skirt 15 extends from the second annular flange 14 in a generally axial direction. The second skirt 15 is coupled to the second annular flange 14 at about the outer circumference of the second annular flange 14. In the illustrated embodiment, the second skirt 15 extends slightly less than about half the height of the tapered body 11. In other embodiments, however, the length of the second skirt 15 can be greater or less than that illustrated. As discussed in greater detail below, the first and second skirts 13, 15 help define an indirect flow path around the stop 7 when the stop 7 is in an open position and restrict direct flow when the stop 7 is being moved to a closed position. In some embodiments, the second skirt 15 can be omitted.

When assembled, the tapered body 11 of the stop member 7 is forced into the inner section 6 of the cantilevered end of the passageway 5 before the cap 4 is fitted to the neck 3. The stop member 7 is forced to the position shown in FIG. 2. As shown, the tapered body 11 of the stop 7 is substantially completely inserted into the passageway 5. Furthermore, the ribs 18 on the first skirt 13 engage the outer surface of the passageway 5 to at least partially assist with holding the stop 7 in place. Once the stop 7 is inserted into the passageway as shown in FIG. 2, the cap 4 is then coupled to the neck 3. The cap 4 can be threaded to the neck 3 as illustrated in FIGS. 2-4 or coupled in substantially any other manner. As such, the container 1 is sealed by the closure 4 and the stop 7.

To dispense the liquid stored within the container 1, the container 1 is inverted and mounted on a dispenser, such as shown in FIG. 1. When the container 1 is mounted on the dispenser, a peg, spigot, or other valve actuation device 10 (hereinafter peg) can enter the passageway 5. As the container is lowered onto the peg while coupling the container to the dispenser, the peg 10 extends into and travels along the passageway 5. As this occurs, the peg 10 contacts the stop 7 and pushes it from the sealed position shown in FIG. 1 to a second position, such as shown in FIG. 3 or 4. FIG. 3 illustrates a non-dispensing position wherein the stop 7 is further moved out of engagement with the passageway 7 by the peg each time it is desired to dispense liquid. FIG. 4 illustrates the stop 7 in a position where liquid can be dispensed from the container 1. As shown in FIG. 4, the distal end of peg 10 has pushed the stop member 7 out of engagement with the passageway 5 by the tip portion of the peg contacting the stop 7. The liquid inside the container is now free to be dispensed through the peg as required. In some embodiment, the liquid passes through outer recesses arranged around the distal end of the peg 10.

Although it is not illustrated, an O-ring can be provided on the peg to provide a seal between the inner surface of the passageway 5 and the outer surface of the peg 10, so that the liquid can only be removed from the container through a flow path defined in the peg 10. However, other embodiments may utilize a peg without an internally defined flow path wherein this O-ring may not be desirable.

In normal use, the container 1 may be left on the dispenser until all the liquid inside has been dispensed. When empty, it is removed and suitably disposed of. However, should for any reason the user remove the container 1 while it is still part full, it will be understood that the stop member 7 will be forced into engagement with the cantilevered end of the passageway 5 by the weight of the liquid against the stop member 7. Specifically, the weight of the liquid against the recess 16, first annular flange 12, and the second annular flange 14 pushes the stop member 7 into engagement with the passageway 5. Specifically, the force of the weight pushes the tapered body 11 at least partially into the cantilevered end of the passageway 5. Thus, a conventional spring or other mechanical bias member is not needed in this design to seal the passageway 5. Rather, only the weight of the fluid is needed to seal the passageway 5 in some embodiments.

While the weight of the liquid may be sufficient to create a seal between the tapered body 11 and the inner surface of the passageway 5, the seal can be enhanced by a suction force created by the removal of the peg from the passageway 5. Specifically, the sliding of the o-ring or other seal member against the inner wall of the passageway 5 forms a vacuum, wherein the suction force further pulls the stop into a sealing engagement with the passageway 5. Again, due to this suction force, a conventional spring or other mechanical bias member is not needed in this design to seal the passageway 5. Rather, only the suction force is needed to seal the passageway 5 in some embodiments.

Among other purposes not discussed herein, the skirts 13, 15 on the stop Member 7 help prevent the flow of liquid toward the passageway 5 while the passageway 5 is being resealed by the stop member 7. Specifically, the skirts 13, 15 extend beyond the inner opening in the passageway 5 (relative to the direction of flow without a stop member present). As such, the skirt forces a counter-flow situation (illustrated by arrows in FIG. 4), wherein the fluid must flow in a direction substantially opposite the gravitational flow direction to get to the passageway 5. Furthermore, the tolerances between the passageway 5 and the recess 17 defined by the first skirt 13 create a tortuous passageway 5 to assist with retarding flow toward the passageway 5.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and mariners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A liquid container having a resealable outlet for use on a dispenser for dispensing liquid from the container, the container outlet comprising:
    a passageway defining an inner surface; and
    a non-mechanically biased stop selectively engageable with the inner surface of the passageway to seal the passageway from liquid in the container,
    wherein the passageway is accessible beneath the stop by a dispenser peg for insertion in the passageway to push the stop inwardly of the passageway toward a container interior, the stop comprising:
    a tapered body;
    a first annular flange coupled to the tapered body;
    a first skirt extending away from the first annular flange;
    a second annular flange coupled to the first skirt; and
    a second skirt extending away from the second annular flange,
    wherein at least one of the first skirt and the second skirt at least partially surrounds the tapered body; and
    wherein the stop is adapted to reseal the passageway by the force of weight applied to the first and second annular flange by fluid in the container.

2. A resealable closure and valve assembly adapted to be coupled to a container to selectively control the dispensing of liquid from the container, the resealable closure and valve assembly comprising:
    a cap having an opening and adapted to be coupled to an opening of a container;
    a tubular passageway coupled to the opening in the cap and defining an internal surface, the tubular passageway having a first end coupled to the opening in the cap and a second end extending distally relative to the opening in the cap; and a non-mechanically biased stop selectively engageable with the internal surface adjacent the second end of the tubular passageway to selectively seal the passageway from dispensing liquid contained within the container, the stop comprising:

a tapered body dimensioned and configured to extend into the second end of the tubular passageway and selectively form a seal against an inner surface of the tubular passageway;

a first annular flange coupled to the tapered body, wherein the stop is adapted to reseal the passageway by the force of weight applied to the first annular flange by fluid in the container; and a first skirt extending away from the first annular flange and at least partially surrounding the tapered body.

3. The resealable closure and valve assembly of claim 2, wherein the first skirt at least partially defines a tapered annular recess for receiving the second end of the passageway, at least a portion of the first skirt engages an outer surface of the passageway when the stop sealingly engages the passageway.

4. The resealable closure and valve assembly of claim 3, wherein the stop further comprises a second annular flange coupled to the first skirt, and wherein the stop is adapted to reseal the passageway by the force of weight applied to the second annular flange by fluid in the container.

5. The resealable closure and valve assembly of claim 4, wherein the stop further comprises a second skirt extending away from the second annular flange.

6. A resealable closure and valve assembly adapted to be coupled to a container to selectively control the dispensing of liquid from the container, the resealable closure and valve assembly comprising:

a cap having an opening and adapted to be coupled to an opening of a container;

a passageway coupled to the opening in the cap;

a non-mechanically biased stop selectively engageable with the passageway to seal the passageway from dispensing liquid contained within the container, the stop having a portion positionable within the passageway; and a fluid flow path defined around the stop and along which fluid flows to exit the container, at least a portion of the fluid flow path extending in a generally upward direction along which fluid passing the stop moves in a generally upward direction exterior of the stop portion.

7. The resealable closure and valve assembly of claim 6, wherein the passageway defines an internal surface and the stop is engageable with the internal surface to seal the passageway.

8. The resealable closure and valve assembly of claim 6, wherein the flow path section is at least partially defined by the stop.

9. The resealable closure and valve assembly of claim 6, wherein the passageway is accessible beneath the stop by a dispenser peg for insertion in the passageway to push the stop inwardly of the passageway toward a container interior.

10. The resealable closure and valve assembly of claim 6, wherein the stop includes a first annular flange, and the stop is adapted to reseal the passageway by the force of weight applied to the first annular flange by fluid in the container.

11. The releasable closure and valve assembly of claim 6, wherein the stop includes a skirt at least partially surrounding the stop portion.

* * * * *

UNITED STATES PATENT AND TRADEMARK OFFICE
CERTIFICATE OF CORRECTION

PATENT NO. : 8,490,840 B2  Page 1 of 1
APPLICATION NO. : 12/527854
DATED : July 23, 2013
INVENTOR(S) : Crossdale et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this
Eighth Day of September, 2015

Michelle K. Lee
*Director of the United States Patent and Trademark Office*